UNITED STATES PATENT OFFICE.

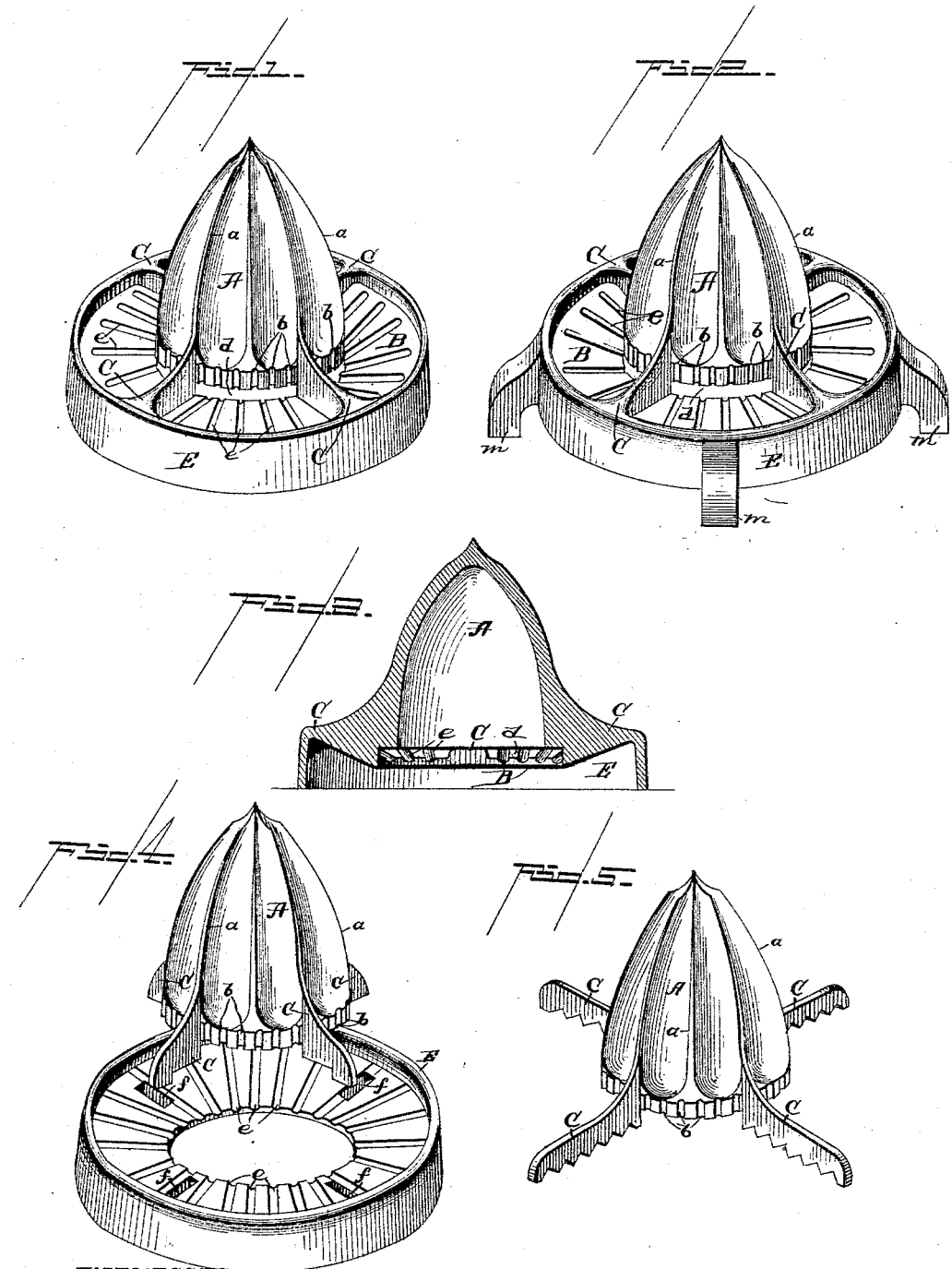

EDWIN BALTZLEY, OF PHILADELPHIA, PENNSYLVANIA.

LEMON-JUICE EXTRACTOR.

SPECIFICATION forming part of Letters Patent No. 387,942, dated August 14, 1888.

Application filed May 2, 1888. Serial No. 272,588. (No model.)

*To all whom it may concern:*

Be it known that I, EDWIN BALTZLEY, a citizen of the United States, residing at Philadelphia, in the county of Philadelphia and State of Pennsylvania, have invented certain new and useful Improvements in Lemon-Juice Extractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for extracting the juice from lemons of that class in which radial and converging knives form the basis, the juice and the pulp of the lemon being extracted by forcing the lemon on the said knives and at the same time giving to the lemon a rotary movement.

The improvement consists of the novel features which hereinafter will be more fully described and claimed, and shown in the annexed drawings, in which—

Figure 1 is a perspective view of a device of my invention; Fig. 2, a perspective view of the device, showing it provided with feet; Fig. 3, a vertical central section of the device shown in Fig. 1; Fig. 4, a perspective view of a modification, showing the cone detached from the drainage-plate and showing its relative position; and Fig. 5, a perspective view of a further modification.

The device is composed, essentially, of two parts—the ribbed cone A and the bed or drainage-plate B. The ribs *a* of the cone are sharp, and the sides slope equally in each direction, giving a like bevel to each side. The ribs extend to the apex of the cone and terminate at some distance above the base of the cone, being widened at their lower ends. The cone is provided with a narrow margin at its base, which margin is provided with a series of preferably vertical channels, *b*, to form ducts for the escape of the juice between the cone and the pulp. The arms C, extending radially from the base of the cone, serve a threefold purpose—first, as supports for the cone; second, base-cutters to remove the pulp from the lower edge of the lemon; and, third, as a means of connection between the bed and the cone. These arms may be extended sufficiently far to form the sole support of the cone on the glass or other suitable vessel, the bed or drainage-plate being dispensed with, as shown in Fig. 5. In the latter case the lower edge of the arms will be serrated to give them a firm purchase on the edge of the glass or vessel and prevent the device from slipping. While the bed or drainage-plate may be dispensed with, it is preferred to provide the same to catch the seeds and pulp and prevent the same from entering into the vessel.

It will be observed that the arms C are in line with and form a prolongation of some of the ribs. The ribs remove the pulp from the skin of the lemon, and the arms at the same time remove the pulp from the lower edge of the skin. The sides of the arms are beveled to an edge to facilitate the cutting action of the arms.

The bed or drainage-plate is provided with a central opening, which is about equal to the diameter of the base of the cone and is arranged a slight distance below the cone to form the channel *d* for the escape of the juice, the channel being narrow enough to prevent the passage of the seeds and the pulp, which are retained on the bed or drainage-plate. The bed flares upwardly from its inner edge, and is preferably provided with the channels *e*, which extend from the inner to the outer edge thereof, and which form ducts to convey the juice beneath the pulp, &c., that may accumulate on the drainage-plate, to the central opening in the said bed or plate. The under side of the bed flares upwardly to center the device when placed on a glass, and also prevent its slipping. The rim E, depending from the outer edge of the bed, gives a finish to the device and prevents it from slipping off of a glass in the event of any lateral motion being imparted thereto.

While for the sake of economy it is preferred to have the bed, the cone, and the arms integral, yet it has been found expedient and of advantage to make the bed and cone integral with the one or the other, the arms being shown integral with the cone and adapted to fit in sockets *f* in the bed.

The device shown in Fig. 2 is in every respect constructed like that shown in Fig. 1, except that it is provided with feet $m$, which are designed to support the drainage-plate at a slight distance from a plate or other flat surface on which the device may be placed. These feet also fit in the angles of a square vessel and prevent the device turning when rotating the lemon on the cone.

Having thus described my invention, what I claim, and desire to secure by Letters Patent, is—

1. The herein-described lemon-juice extractor, composed of a cone having ribs which are sharpened and having arms extending therefrom and forming a prolongation of some of the ribs, substantially as and for the purpose described.

2. The herein-described lemon-juice extractor, comprising the cone having a well-defined margin at its lower edge, and having the ribs and the channels between the ribs extending from the said margin to the apex of the cone, and having juice-channels formed in the face of the margin only and extending from the top to the bottom of the said margin, substantially as shown.

3. The combination, with the cone having the ribs $a$ and arms C integral with the cone, of the drainage-plate, substantially as and for the purpose described.

4. The combination, with the cone having the ribs $a$, and the bed or drainage-plate having a central opening which is about equal to the diameter of the base of the cone, the bed being set below the cone to form a slot for the egress of the juice, of the arms extending from the cone, substantially as and for the purpose described.

5. The combination, with the cone having the ribs $a$ and arms C, of the flaring drainage-plate having the channels $e$, substantially as and for the purpose described.

6. The herein-described lemon-juice extractor, composed of the cone having the ribs $a$, and having a margin at its base which is provided with juice-channels, the flaring bed having the channels $e$ and having a depending rim, and the arms interposed between the bed and cone and forming base-cutters, substantially as and for the purpose specified.

In testimony whereof I affix my signature in presence of two witnesses.

EDWIN BALTZLEY.

Witnesses:
WILLIAM G. WISE,
GEORGE H. GRIFFIN.